United States Patent [19]

Chitayat

[11] Patent Number: 4,812,725
[45] Date of Patent: Mar. 14, 1989

[54] POSITIONING DEVICE WITH DUAL LINEAR MOTOR

[76] Inventor: Anwar Chitayat, Duck Island, P.O. Box 107, Northport, N.Y. 11768

[21] Appl. No.: 109,086

[22] Filed: Oct. 16, 1987

[51] Int. Cl.⁴ .......................... H02P 5/46; B66C 19/00
[52] U.S. Cl. ........................................ 318/625; 318/68; 318/85; 318/632; 212/131
[58] Field of Search ................. 318/625, 687, 38, 112, 318/675, 676, 632, 85, 68; 414/138; 212/126, 131, 159, 160, 256, 271

[56] References Cited

U.S. PATENT DOCUMENTS

| | | | |
|---|---|---|---|
| 3,588,660 | 6/1971 | Puikhiser | 318/625 X |
| 3,644,916 | 2/1972 | Gilbert | 318/676 X |
| 4,087,731 | 5/1979 | Rhoades | 318/625 |
| 4,362,978 | 12/1982 | Pollard et al. | 318/632 X |
| 4,499,546 | 2/1985 | Kuga et al. | 318/632 X |
| 4,587,469 | 5/1986 | Ikebo et al. | 318/632 X |
| 4,629,955 | 12/1986 | French et al. | 318/625 |
| 4,656,577 | 4/1987 | Herman | 318/625 X |
| 4,667,136 | 5/1987 | Bell | 318/68 X |
| 4,714,400 | 12/1987 | Barnett et al. | 318/625 X |

FOREIGN PATENT DOCUMENTS 2100885 1/1983 United Kingdom ............... 318/632

*Primary Examiner*—Bentsu Ro
*Attorney, Agent, or Firm*—Thomas R. Morrison

[57] ABSTRACT

A linear motor system includes first and second linear motors driving a load along spaced-apart supports. A positioning table, or a portion of a machine tool, supported between the first and second linear motors includes a device for varying the position of the table or portion along an axis extending between the first and second linear motors. A single motor control system produces a motor drive signal. A proportioning device proportions the portion of the motor drive signal fed to the two motors in a proportion controlled by the position of the table or portion.

1 Claim, 4 Drawing Sheets

POSITIONING DEVICE WITH DUAL LINEAR MOTOR

CROSS REFERENCE TO RELATED APPLICATIONS

This application is related to U.S. patent application Ser. No. 109,978, filed on the same date as the present application.

BACKGROUND OF THE INVENTION

The present invention relates to positioning devices and, more particularly, to linear positioning devices capable of positioning a workpiece in at least first and second angularly displaced axes.

Linear motors conventionally are used in applications requiring the application of modest force along a linear axis. One application, disclosed in U.S. Pat. No. 4,595,870, for example, includes driving one axis of a positioning table for displacing a workpiece along the axis. Such applications are characterized by high precision in positioning, and modest force and acceleration requirements. The linear motor eliminates the windup characteristic of ball-screw drives and substantially reduces the mass of the moving element. Both of these characteristics of linear motors provide benefits in workpiece positioning precision and acceleration.

The force of which linear motors are capable is limited by resistive heating in the windings of the armature of the linear motor. In my U.S. patent application Ser. No. 859,915 now abandoned, I disclose several techniques for cooling a linear motor. In cooling techniques using liquid coolant, I have discovered that it is possible to attain high forces in permanent magnet DC linear motors using a moderate flow of a liquid coolant in thermal contact with the armature windings. Such high force permits such linear motors to be used in applications not previously considered for such a class of motors.

In my U.S. patent application Ser. No. 15,680, I disclose a high-force linear motor adapted for integration into the bed of a machine tool. Certain machine-tool applications require very long travel at high speeds and accelerations. The present invention addresses one such application wherein, in addition to the foregoing requirements, long linear axes must be accommodated.

In my U.S. Pat. No. 4,505,464, I disclose a positioning table which takes advantage of the magnetic attraction between permanent magnets and armature iron for preloading bearing supporting the movable element of the positioning table. Two sets of magnets in orthogonal planes provide bi-directional preloading.

In the above-referenced related patent application, a pair of spaced-apart parallel rails define an X axis along which it is desired to displace a load. The load may include a Y-axis table capable of displacement at right angles to the X axis. A permanent magnet DC linear motor on one of the rails employs a plurality of permanent magnets affixed to the rail and an armature movable by control signals along the rail. An outboard linear motor assembly is supported on the second rail. The Y-axis assembly is supported between the linear motor and the outboard assembly. An angle of magnetic attraction between the armature and the permanent magnets is controlled to direct the static magnetic attractive force in a direction which, when combined with static and dynamic loads, produces a resultant force in a desired direction. The related application also discloses embodiments with rectangular rails, resin inserts in the rails for more easily attaining a precise surface finish, composite rails with a magnetic metal strip backing the permanent magnets, an integrated motor saddle and air bearing assembly, and damping material in the rails for damping vibrations. The disclosure of this related patent application is incorporated herein for background material.

It is believed that there may be apparatus having first and second parallel rails with a first linear motor on the first rail driving one end of the Y-axis assembly, and a second linear motor on the second rail driving the other end of the Y-axis assembly. It is believed that this apparatus controls each of the first and second linear motors in a conventional manner. That is, a conventional motor controller with velocity and/or position feedback devices is provided for each linear motor. Motor controllers and feedback devices are expensive and providing two of them adds a significant cost burden to the resulting system.

OBJECTS AND SUMMARY OF THE INVENTION

Accordingly, it is an object of the invention to provide an X-Y positioning device which overcomes the drawbacks of the prior art.

It is a further object of the invention to provide a positioning table having first and second spaced-apart linear motors driving opposed ends of a load. A single motor controller generates a drive signal and a proportioning device proportions the drive signal to the two linear motors in accordance with an expected ratio of force requirements.

It is a still further object of the invention to provide an X-Y positioning table in which an X-axis assembly includes first and second spaced-apart linear motors are disposed on parallel rails. A Y-axis assembly, supported on the X-axis assembly includes means for displacement of a load at right angles to the X axis. A single motor controller produces a drive signal and a proportioning device proportions the drive signal in relation to the position of the load along the Y axis, whereby differences in force requirements for the first and second linear motors is accommodated automatically.

It is a still further object of the invention to provide an X-Y positioning table according to the preceding paragraph wherein the proportioning device is responsive to an electro-mechanical measurement of the position of the Y-axis assembly.

It is a still further object of the invention to provide an X-Y positioning table as above wherein the proportioning device is responsive to a control signal generated by a Y-axis motor controller.

Briefly stated, the present invention provides a linear motor system including first and second linear motors driving a load along spaced-apart supports. A positioning table, or a portion of a machine tool, supported between the first and second linear motors includes a device for varying the position of the table or portion along an axis extending between the first and second linear motors. A single motor control system produces a motor drive signal. A proportioning device proportions the portion of the motor drive signal fed to the two motors in a proportion controlled by the position of the table or portion.

According to an embodiment of the invention, there is provided a positioning device comprising: a first linear motor movable along a first axis, a second linear motor movable along a second axis parallel to the first axis, the first and second axes being spaced apart, a positionable device positionable along a third axis normal to the first and second axes to selectable positions with respect to the first and second axes, means for producing a control signal for controlling the first and second linear motors, and means for proportioning the control signal to the first and second linear motors in response to selectable positions of the positionable device along the third axis.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
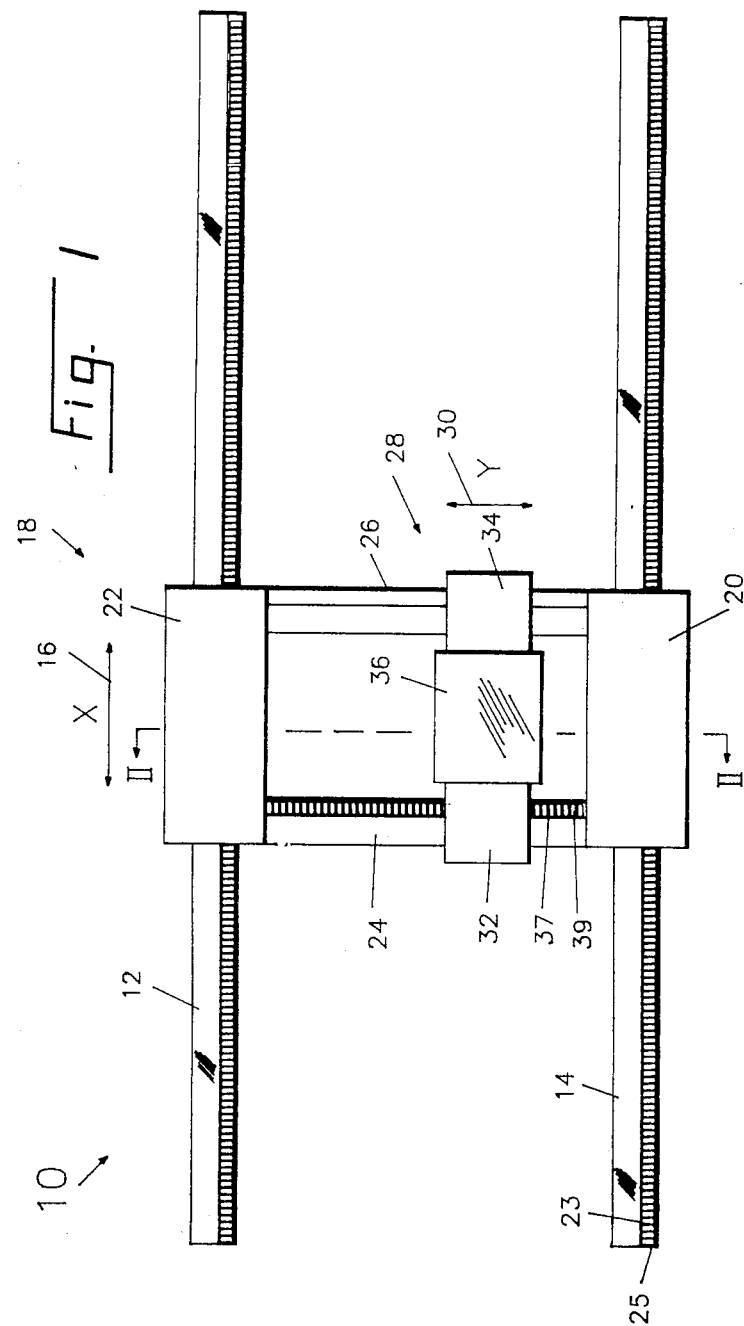
FIG. 1 is top view of an X-Y positioning system according to an embodiment of the invention.

Referring now to FIG. 1, an X-Y positioning system, shown generally at 10, includes first and second parallel rail 12 and 14 defining an X axis as indicated by an X-axis arrow 16. An X-axis assembly 18 includes a first linear motor 20 on rail 14 and a second linear motor 22 on rail 12.

A Y-axis assembly, shown generally at 28, may be of any convenient type capable of displacing a workpiece support 36 along a Y axis as indicated by a Y-axis arrow 30. Although the exact nature of Y-axis assembly 28 is not of concern to the present invention, for concreteness, an embodiment is shown in which first and second parallel rails 24 and 26 are affixed at opposed ends thereof to linear motor 20 and linear motor 22. A linear motor 32 on rail 24 provides driving force in the direction of Y-axis arrow 30. An outboard assembly 34, which may contain bearing (not shown), or may include a second linear motor corresponding to linear motor 32, is disposed on rail 26. Concerted movement of linear motor 32 and outboard assembly 34 is effective for displacing workpiece support 36 to any position between the limits of the Y axis.

Figure 2:
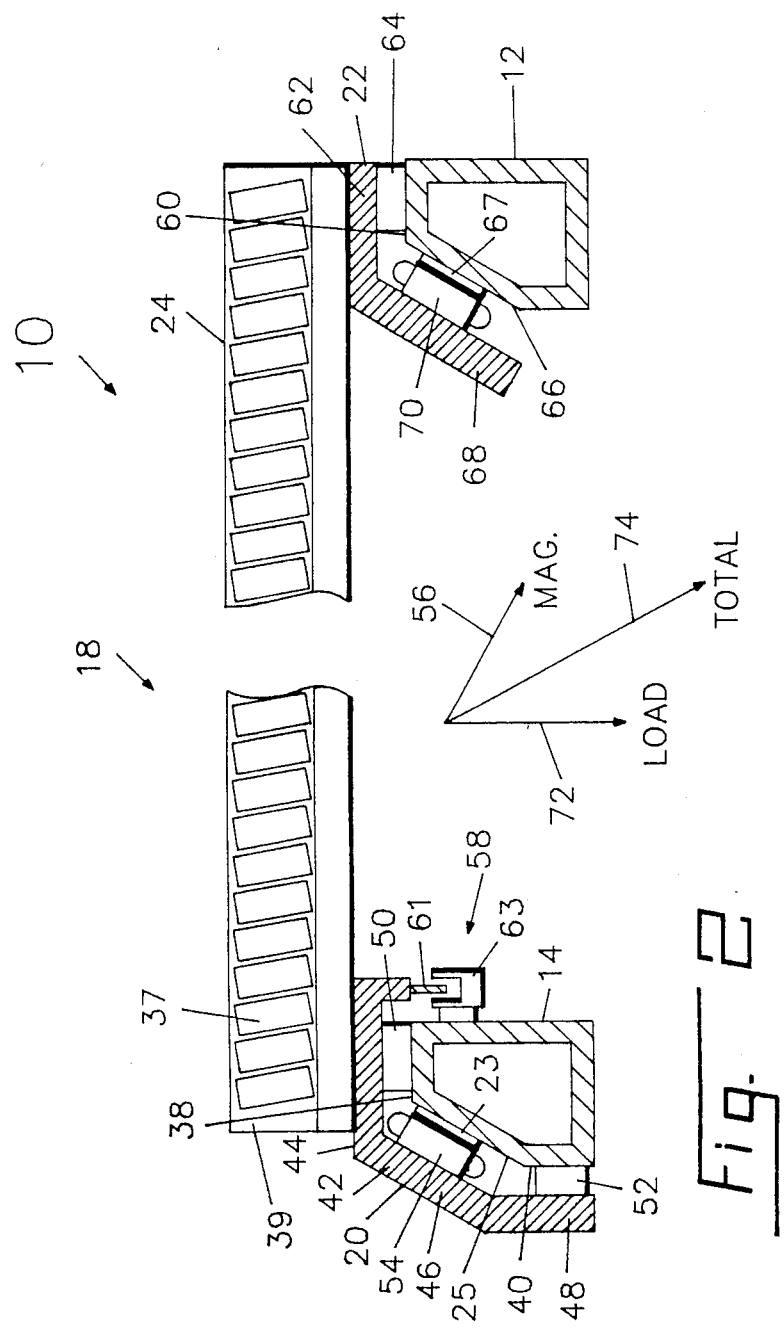
FIG. 2 is a cross section of the positioning taken along II—II in FIG. 1.

Referring now also to FIG. 2, rail 14 includes a horizontal top surface 38 and a vertical side surface 40 joined by a sloping side surface 25. Sloping side surface 25 includes thereon a plurality of permanent magnets 23, best seen in FIG. 1. A saddle 42 includes a horizontal arm 44 affixed under rail 24, a sloping arm 46 and a vertical arm 48. The slope of sloping arm 46 substantially equals the slope of sloping side surface 25. A vertical bearing 50 is affixed to horizontal arm 44 facing horizontal top surface 38 for supporting vertical components of total load. A horizontal bearing 52 is affixed to vertical arm 48 facing vertical side surface 40 for supporting horizontal components of total load. Vertical bearing 50 and horizontal bearing 52 may be of any convenient type including, for example, air bearings.

The construction and function of these bearings are assumed to be fully conventional and further detailed description thereof is properly omitted.

An armature 54 of linear motor 20 is affixed to sloping arm 46 facing permanent magnets 23. As is conventional, armature 54 includes a mass of magnetically attractable material such as, for example, silicon steel, spaced a small distance from the surfaces of permanent magnets 23. A magnetic attractive force 56 is produced at an angle normal to the plane of the facing surfaces of armature 54 and sloping arm 46.

A conventional position and velocity feedback generator 58 produces a control signal useable by a control system for controlling drive signals applied to linear motor 20 and linear motor 22. Although the present invention is indifferent to the type of device employed in position and velocity feedback generator 58, one type which may be used is an optical device employing a transparent ruler 61 affixed to linear motor 20 and an optical sensor 63 associated therewith. A pattern of lines (not shown) on transparent ruler 61 interferes in a known manner with the passage of light (or infra-red radiation) through transparent ruler 61, whereby an output signal is generated for feedback to the control system.

The selection of a position for position and velocity feedback generator 58 may vary for different applications. It should be clear to one skilled in the art that skew of X-axis assembly 18 could occur due to unequal loading of linear motors 20 and 22. With position and velocity feedback generator 58 rigidly affixed to linear motor 20, the position and velocity of linear motor 20 may be measured while a significant error in knowledge may exist about the position and/or velocity of linear motor 22. In some applications, such uncertainty may be acceptable. A more preferred location for position and velocity feedback generator 58 is centered along the Y axis between linear motors 20 and 22. In this location, skew errors are substantially reduced since the sensed position and/or velocity at such a central location includes contributions from both linear motors 20 and 22.

Rail 12 has a horizontal top surface 60 facing a horizontal arm 62 of linear motor 22. A vertical bearing 64 is affixed to horizontal arm 62 for supporting vertical loads on horizontal top surface 60. A sloping side surface 66 on rail 12 includes a plurality of permanent magnets 67 affixed thereto. A sloping arm 68 supports an armature 70 closely spaced from permanent magnets 67. The angles of sloping side surface 66 and sloping arm 68 are substantially equal to the angles of sloping side surface 25 and sloping arm 46, whereby the angle of magnetic attraction between permanent magnets 67 and armature 70 is described by magnetic attractive force 56. It will be noted that linear motor 22 lacks a counterpart of horizontal bearing 52 in linear motor 20. Thus, substantially the entire horizontal component of total load is borne by horizontal bearing 52. Omission of a horizontal bearing from linear motor 22 avoids clearance problems which could arise from thermal expansion and contraction of rails 24 and 26. In some applications such omission may not be necessary and an embodiment of the invention which includes a horizontal bearing in linear motor 22 should be considered to fall within the scope of the present invention.

A total static load imposed on rail 12 and 14 is represented by a static vertical load arrow 72. When the system is at rest, the combination of magnetic attractive force and vertical static load is represented by a total load arrow 74. As discussed more fully in the referenced related patent application, the angles at which magnetic attractive force 56 is inclined is selected to position total load arrow 74 at a desired angle. One angle which may be desirable for total load arrow 74 is about 45 degrees from the horizontal. Other angles may be selectable to accommodate peculiarities of dynamic components of load resulting from acceleration of the load on workpiece support 36, and of X-axis assembly 18 and rail 26.

Referring again to FIG. 1, the driving forces which must be exerted by linear motors 20 and 22 to achieve a given acceleration of X-axis assembly 18 and any load on workpiece support 36 depends on the position of Y-axis assembly 28 along the Y axis. That is, when workpiece support 36 is positioned closer to linear motor 20 as illustrated, a greater acceleration is required from linear motor 20 than from linear motor 22 because of the shorter moment arm between linear motor 20 and the load. If workpiece support 36 is positioned closer to linear motor 22, then the reverse is true. Thus, it is possible to predict that a ratio of forces required from linear motors 20 and 22 can be related to the position of workpiece support 36 along the Y axis. The relationship may be direct or may bear a transcendental or other relationship to the position of workpiece support 36. For present purposes, it is sufficient to assume that the relationship is direct and linear. One skilled in the art having access to the present disclosure would be fully enabled to select any other required relationship using conventional components available at the time of filing of the present application.

Figure 3:
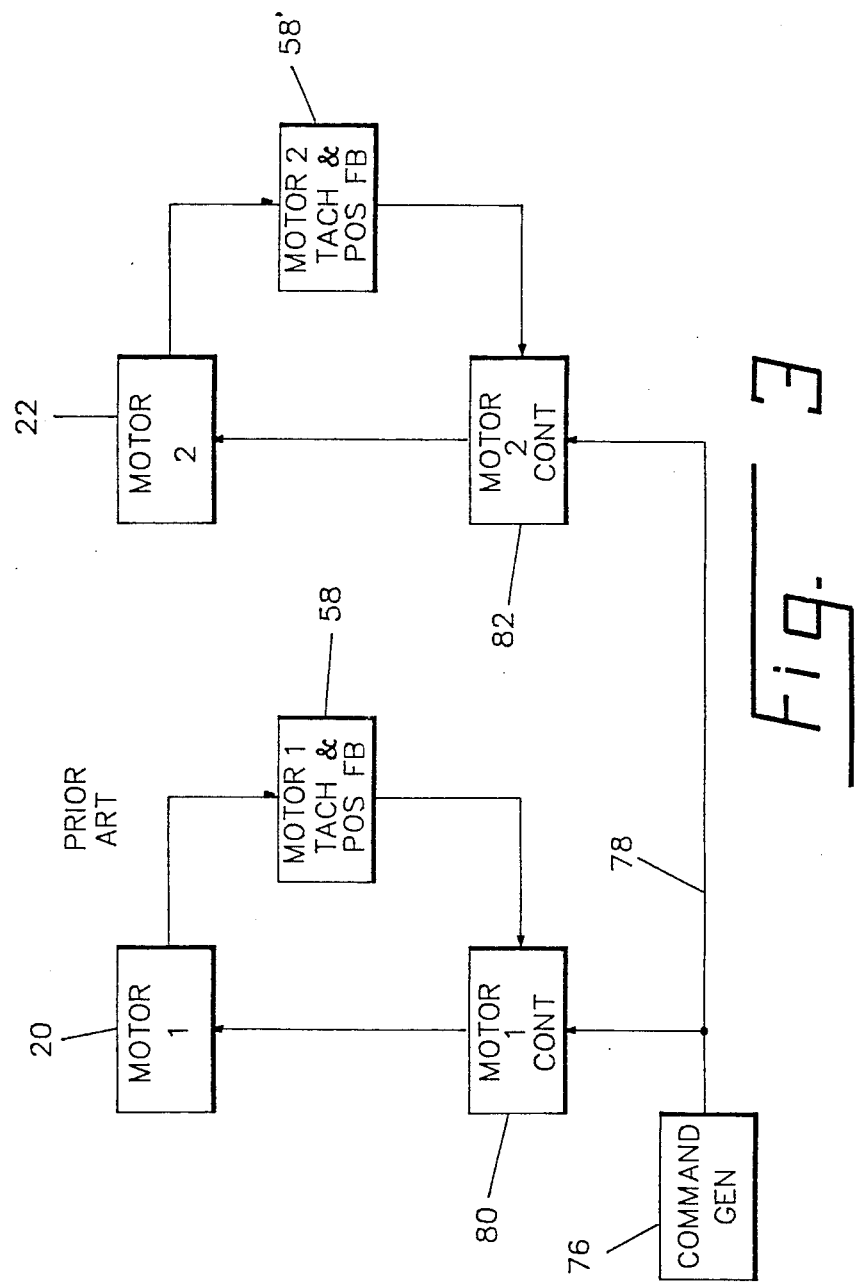
FIG. 3 is a functional block diagram of a motor controller for a dual linear motor system according to the prior art.

Referring now to FIG. 3, as noted in the description of the background of the invention, systems in the prior art may include linear motors 20 and 22 with separate and independent control systems. A command signal generator 76 produces a position, velocity and/or acceleration command for application on a line 78 to a motor 1 controller 80 and a motor 2 controller 82. Motor 1 controller 80 produces drive signals useable by linear motor 20 for developing a commanded force, velocity and/or acceleration. Position and velocity feedback generator 58 provides feedback signals to motor 1 controller 80 to permit motor 1 controller 80 to increase or decrease an amplitude of its drive signals to adjust the actual position, velocity and/or acceleration to coincide with the commanded value. Similarly, motor 2 controller 82 produces drive signals for application to linear motor 22. A position and velocity feedback generator 58' provides feedback signals for permitting motor 2 controller 82 to adjust its drive signal as required. In such a system, the amount of force produced by each motor, and thus the ratio of such forces, is controlled in response to feedback signals without concern for where workpiece support 36 is located along the Y axis. It turns out, however, that identifying the position of workpiece support 36 along the Y axis as a variable relating the ratio of forces required from the two linear motors permits a major simplification in the apparatus.

Figure 4:
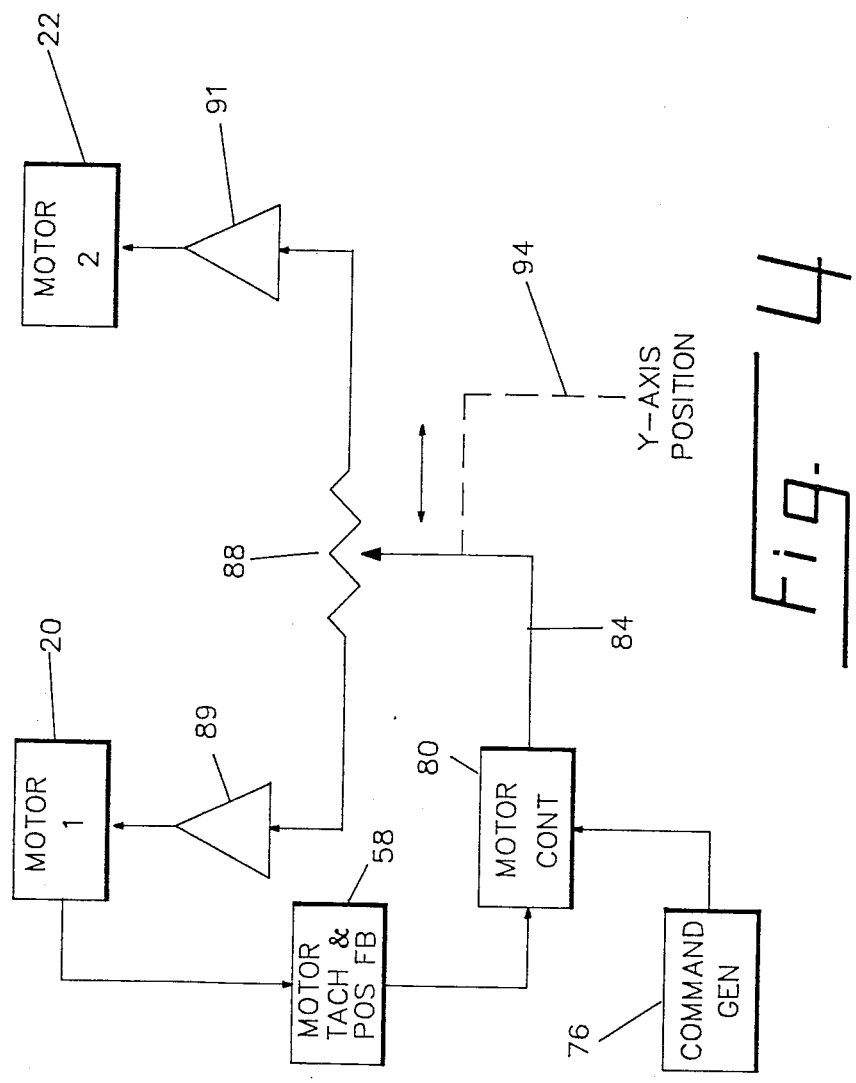
FIG. 4 is a functional block diagram of a motor controller for a dual linear motor system according to the present invention.

Referring now to FIG. 4, an embodiment of the invention is shown wherein a single motor 1 controller 80 produces all of the drive signals required for driving both linear motor 20 and linear motor 22. The single drive signal, produced in response to a command signal from command signal generator 76 is applied on a line 84 to a load splitter 88. A first drive voltage at one end of load splitter 88 is connected through a power amplifier 89 to linear motor 20. A second drive voltage at the other end of load splitter 88 is connected through a power amplifier 91 to linear motor 22.

A control, represented by a dashed line 94, controls the position of the movable element of load splitter 88, and thereby controls the portion of the drive signal on line 84 fed to linear motors 20 and 22. In the preferred embodiment, the control on dashed line 94 is responsive to the position of Y-axis assembly 28 (FIG. 1) along the Y axis. In this manner, the ratio of amplitudes of the drive signals applied to linear motors 20 and 22 is varied in relation to the Y position of Y-axis assembly 28.

The representation of load splitter 88 as a variable resistor has been chosen for purposes of illustration and description. Load splitter 88 may be, for example, a slide wire sensor (not shown) associated with Y-axis assembly 28. As Y-axis assembly 28 passes along the Y axis, an electrical output signal is derived from a movable element moving with Y-axis assembly 28 for connection to line 84.

Other techniques for proportioning the control signals to drive linear motors 20 and 22. For example, if Y-axis assembly 28 is a positioning table controlled by its own Y-axis controller (not shown), such Y-axis controller always contains a representation of the Y-axis position of its table. In one embodiment, the Y-axis controller is a digital device constantly updating the Y-axis position according to feedback signals it receives. This information, in analog or digital form, may be applied for controlling the drive-signal proportioning between the two linear motors of X-axis assembly 18. In one embodiment, the Y-axis controller produces two separate analog or digital values containing the desired drive proportioning for application to power amplifiers 89 and 91.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A positioning device comprising:
   first and second spaced-apart linear motors movable parallel to each other along an X axis;
   a Y-axis assembly bridging said first and second spaced-apart linear motors;
   said Y-axis assembly including a workpiece support;
   means for moving said workpiece support to selectable positions along a y axis normal to said X axis;
   means for producing a first control signal responsive to a position of said workpiece support along said Y axis;
   control signal means for producing a motor control signal;
   proportioning means responsive to said first control signal for proportioning said motor control signal between said first and second linear motors;
   said proportioning means including means for producing first and second signals for feeding to said first and second linear motors respectively;
   said first linear motor including feedback means for producing a feedback signal indicating one of a position and a velocity;
   said control signal means being responsive to said feedback signal to vary said motor control signal in response thereto, whereby said first linear motor is driven under closed-loop control and said second linear motor is driven under open-loop control in response to a closed-loop control signal produced in response to said feedback signal from said first linear motor.

* * * * *